UNITED STATES PATENT OFFICE.

JOHN G. KOPPING AND JOHN WEIDEMAN, OF CLINTON, IOWA, ASSIGNORS OF ONE-HALF THEIR RIGHT TO ARCHIBALD B. HENRY, OF SAME PLACE.

IMPROVEMENT IN BAKING-POWDERS FOR BREAD.

Specification forming part of Letters Patent No. 143,580, dated October 14, 1873; application filed September 2, 1873.

*To all whom it may concern:*

Be it known that we, JOHN G. KOPPING and JOHN WEIDEMAN, of Clinton City, in the county of Clinton and State of Iowa, have invented certain new and useful Compound for Baking-Powders; and we do hereby declare the following to be a full, clear, and exact description of the invention, such as will enable others skilled in the art to which it pertains to make and use it.

Our invention relates to that class of compounds called baking-powders; and consists in mixing, in a dry state, and in the proportions hereinafter described, barley-malt flour, tartaric acid, cream tartar, soda, wheat flour, and corn-starch, viz:

Take of barley-malt flour, two (2) pounds; tartaric acid, one (1) pound; cream tartar four (4) pounds; soda, three (3) pounds; wheat flour, two (2) pounds; and corn-starch, two (2) pounds.

Mix these ingredients evenly and thoroughly, and keep the compound dry and close in tin cans or glass bottles.

The compound is used by mixing a suitable quantity of it with the flour which is to be baked into bread.

The barley-malt flour increases the raising capacity of the compound, and enables it to retain that capacity longer, and thus in baking, when the stove is not sufficiently hot, the bread is not so liable to "fall."

We claim—

The baking compound, of the ingredients in the proportions stated, prepared in a dry state, to be mixed with the flour, all substantially as described.

In testimony that we claim the foregoing we have hereunto set our hands this 4th day of August, 1873.

J. G. KOPPING.
JOHN WEIDEMAN.

Witnesses:
WM. W. SANBORN,
W. B. PECK.